UNITED STATES PATENT OFFICE.

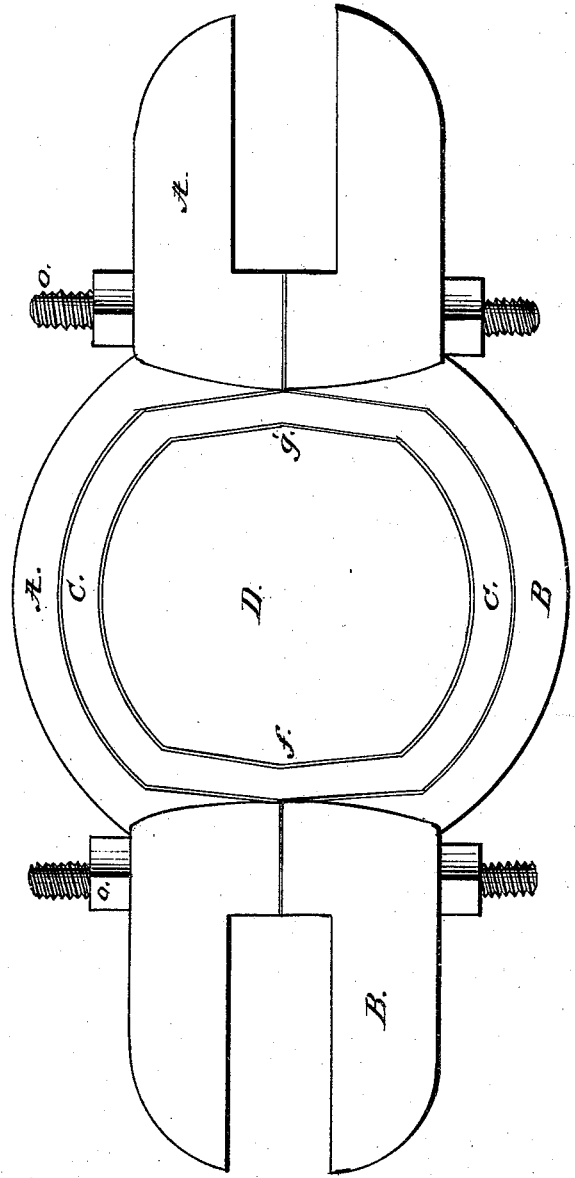

WILLIAM BEERS, OF MILAN, OHIO.

YOKE OF SHIPS' RUDDER-POSTS.

Specification of Letters Patent No. 23,149, dated March 8, 1859.

*To all whom it may concern:*

Be it known that I, WILLIAM BEERS, of Milan, in the county of Erie and State of Ohio, have invented a new and Improved Yoke for Rudder-Posts for Steering Vessels; and I do hereby declare that the following is a full and exact description thereof, reference being had to the accompanying drawings and to the letters of reference marked thereon.

The common yokes attached to rudder posts for steering vessels are liable in dry weather to become loose owing to the shrinking of the rudder post; and the violent strains upon the yoke are liable to chafe the post, or, in seamen's phrase, the yoke "chews" up the rudder post. When the yoke once becomes loose upon the rudder post, it is very difficult to fasten the yoke, consequently, the fibers of wood are broken little by little until the post is rendered wholly worthless, and the expense of a new one must necessarily be incurred. In order to obviate these disadvantages, I have made my improvement in the yoke.

My invention consists of a divided yoke for rudder post, and in the use of an india rubber, or other elastic guard, to prevent the yoke from injuring the post, or from becoming loose in dry weather.

The accompanying drawing represents a top view of my improved yoke, when attached to the top of the rudder post.

The yoke is made in two parts A, and B, which parts are held together by screw bolts and nuts o. Usually I employ four of these bolts to fasten the sections A and B together. Around the rudder post the eye of the yoke is packed with india rubber, C, or other elastic substance. This rubber guard may be an inch in thickness previous to its insertion. It is first put around the rudder post, and then the two sections A and B, are put on so as to compress the rubber by means of the screw bolts o.

The rudder post may be made with a slight double bevel on two sides, as seen at *f*, *g*, and rounded on the others, so that the two sections of the yoke may press firmly near the points *f*, *g*, and without cramping the rubber too much at the corners. In this manner the yoke can be brought home upon the rubber, and made to clamp or grasp the rudder post, with great firmness on all sides without the possibility of injuring the fibers of the rudder post. The rubber guard C, not only prevents chafing the post by the iron yoke, but it also allows the post to shrink and to swell with the changes of weather without loosening the joint, as the rubber will expand when the wood contracts, and be again compressed as the wood expands. Moreover the guard C serves as a spring bed or cushion for the yoke, and consequently it will prevent concussions upon the yoke, the rudder post, and the parts bearing upon either of these in steering the vessel, thus in some degree protecting the whole steering machine.

One great advantage of my improvement is, its adaptability to old rudder posts, to which my improved yoke can be applied with the greatest facility.

I do not intend to limit myself to the particular manner of dividing the yoke, and of fastening the two sections together, though I prefer the mode above described.

The employment of the rubber guard in the construction of rudder yokes is the most important feature of my invention.

I am aware that india rubber has been employed in various ways for producing tight joints and for protecting parts of machines liable to injury from friction or concussion, therefore I do not claim the use of rubber as a new device; but What I do claim and desire to secure by Letters Patent of the United States is:

The construction of a divided yoke for rudder posts, in combination with the employment of a guard of india rubber, or other elastic packing, between the yoke and the post, in order to prevent injury to the rudder post and also to facilitate the repair of damages produced by the common yoke substantially as set forth.

WILLIAM BEERS.

Witnesses:
G. BREED,
DANIEL BREED.